US006596966B1

(12) United States Patent
Kickelhain et al.

(10) Patent No.: US 6,596,966 B1
(45) Date of Patent: Jul. 22, 2003

(54) METHOD FOR MAKING A MARKING IN A GLASS BODY

(75) Inventors: Joerg Kickelhain, Neustadt (DE); Gennadij Kusnezow, Langenhagen (DE); Dieter Biere, Bad Salzuflen (DE)

(73) Assignee: LPKF Laser & Electronics AG, Garbsen (DE)

( * ) Notice: Subject to any disclaimer, the term of this patent is extended or adjusted under 35 U.S.C. 154(b) by 0 days.

(21) Appl. No.: 09/601,443

(22) PCT Filed: Nov. 23, 1999

(86) PCT No.: PCT/DE99/03719

§ 371 (c)(1),
(2), (4) Date: Sep. 15, 2000

(87) PCT Pub. No.: WO00/32531

PCT Pub. Date: Jun. 8, 2000

(30) Foreign Application Priority Data

Dec. 2, 1998 (DE) ........................................ 198 55 623

(51) Int. Cl.[7] ................................................ B23K 26/40
(52) U.S. Cl. .................................................. 219/121.69
(58) Field of Search ....................... 219/121.69, 121.85; 65/441, 111

(56) References Cited

U.S. PATENT DOCUMENTS 5,175,425 A * 12/1992 Spratte et al.
5,206,496 A * 4/1993 Clement et al.
5,300,466 A * 4/1994 Elmer et al.
5,474,851 A * 12/1995 Ganswein
5,557,171 A * 9/1996 Marlor et al.
5,599,753 A * 2/1997 Watzke et al.
5,864,427 A * 1/1999 Fukano et al.
6,055,829 A * 5/2000 Witzmann et al.
6,143,382 A * 11/2000 Koyama et al.
6,211,526 B1 * 4/2001 Huston et al.
6,392,683 B1 * 5/2002 Hayashi

FOREIGN PATENT DOCUMENTS

JP 9-122940 * 5/1997
JP 10-101379 * 4/1998
JP 10-123357 * 5/1998
JP 11-119439 * 4/1999

* cited by examiner

*Primary Examiner*—Geoffrey S. Evans
(74) *Attorney, Agent, or Firm*—Crowell & Moring LLP

(57) ABSTRACT

A method for making a marking which is located beneath the surface of a glass body, in which the glass has a transmission curve with a plateau area at wavelengths which are longer than those of X-rays. A laser beam is directed onto a surface of the body. The laser beam can penetrate the body to a predetermined depth of the marking and is focused at the predetermined place of the marking inside the glass. The laser beam has a power density high enough to mark this location, essentially without changing the surface of the glass body in any perceptible way. The method is characterized in that a wavelength of the laser is used which makes the glass partially translucent and which is shorter than all the wavelengths of the laser light corresponding to the plateau area of the respective transmission curve. Using this method, very fine markings can be produced spaced a small distance underneath the surface of the glass body.

4 Claims, 1 Drawing Sheet

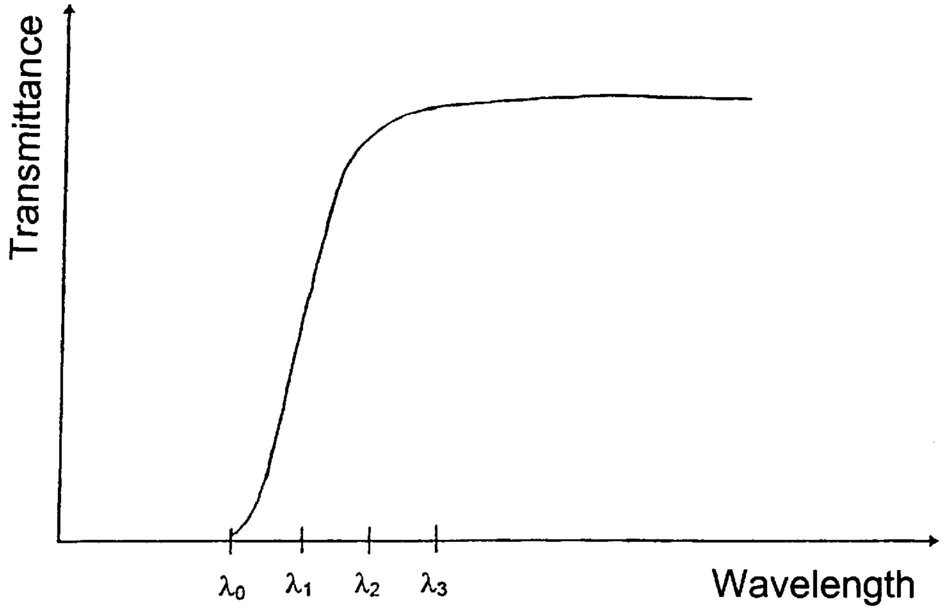
Fig.

METHOD FOR MAKING A MARKING IN A GLASS BODY

BACKGROUND OF THE INVENTION

This invention relates to a method for making marks under the surface in a body of a glass which has a transmission curve with a plateau area at wavelengths which are greater than those of x-rays, wherein a laser beam is aimed at a surface of the body which can penetrate the body to a predetermined depth of the mark, and also is focused at a predetermined location of the mark within the glass, and which has such a power density that a mark develops at the location in the form of a material alteration distinguished by a lowered permeability to electromagnetic radiation, substantially without any alteration that can be detected in any way at the surface of the body.

In EP 0 543 899 B1 a method is disclosed for producing marks in a glass body in of this type. In this method, laser radiation is used with such an energy density that at the focus—i.e., at the point where the marking is to be done—the energy density suffices to produce permanent alterations within the body, which can consist of glass or even another material. Therein it is described as advantageous if the energy density at the focus of the laser beam amounts to at least 10 $J/cm^2$, since this is approximately the threshold for the occurrence of localized ionization of the glass molecule. According to the known method, laser radiation with a wavelength of 1.06 $\mu$m is used for the purpose.

It is a disadvantage that, at this wavelength, which is in the infrared range, the corresponding transmittance for glass is in the plateau part of the transmission curve of the glass. This signifies that, at this wavelength, the transmission of the laser beams through the glass body is approximately at a maximum if the absorption is linear. In order for the desired alteration of the glass to occur in the focus area of the laser beam—that is, the desired nonlinear absorption, a certain energy density threshold must be exceeded, as stated above. If the laser beam is in the infrared range, however, this energy density threshold is very sharp, so that an abrupt transition occurs from linear absorption to the nonlinear absorption producing the mark.

This might be the reason for the fact that, in the known method, an alteration of the glass takes place beyond the actual range of focus of the laser radiation, which is connected with the fact that this bubble-like alteration, which can be explained by a local fusion of the glass, occurs abruptly, almost explosively. This results in the necessity that the mark, which is produced by a series of these point marks, must be spaced a certain minimum distance from the surface of the glass body, since otherwise the points reach from their center beneath the surface of the glass body to the surface and therefore cause a rupture of the glass at the surface. In the known method, the minimum distance of a mark in a glass body from the surface is about 1 millimeter, so that the glass body must have a total thickness of at least 3 millimeters to avoid the risk of breakage.

Furthermore, a method of the kind has been described in "Laser Magazin" 1/95, p. 16 ff. This method, in which laser beams were also used with a transmittance within the plateau region of the transmission curve of the glass used, showed the best results in the case of quartz glass with regard to the expansion of the area of fusion, which reached about 100 $\mu$m. When different process parameters were used, the expansion of the area of fusion also amounted to several hundred micrometers. This method thus has basically the same disadvantages as the known method described above.

SUMMARY OF THE INVENTION

Therefore it is the object of the invention to provide a method of the kind described above in which the individual points which together make the mark can be produced with a very small minimal diameter.

This object is achieved by the method described and claimed herein after. Since a wavelength of the laser light is used at which the glass is partially translucent and which is shorter than all of the wavelengths of the laser light corresponding to the plateau area, the result is that the expansion of the marking points in the glass body can be kept very small. This effect has been found surprising. A possible explanation might be that in wavelengths which correspond to a transmittance below the plateau level, the transition from substantially linear absorption to absorption with a considerable content of nonlinear absorption is "softer," i.e., an energy density range exists in which the proportion of nonlinear absorption gradually increases. For it has been found experimentally that, according to the invention, the expansion of the marking point can be very well controlled by appropriate adjustment of the energy density in the focus area and accordingly even glass bodies of a thickness of only 1 mm can be provided with marking in their interior.

Furthermore, the method of the invention for the interior patterning of glass has the advantage over the state of the art that the laser radiation, due to the shorter wavelengths used, can be focused better and thus additional favorable conditions are created for minimizing the spreading of the focus.

Preferably, a wavelength at which the transmittance is 60 to 95% of the plateau level is selected for the laser radiation.

Also, in the scope of the invention provision is made for the laser radiation to be produced by means of an Nd-YAG laser, using, for example, the third harmonic or also the fourth harmonic.

As a rule the wavelength will be in the UV range. It is important, of course, that the wavelength be made so great that there will be a partial translucency in the glass body, at which sufficient radiation intensity is present at the desired marking location.

BRIEF DESCRIPTION OF THE DRAWINGS

The invention will now be further explained with the aid of an embodiment, with reference to the FIGURE.

The single FIGURE is a schematic representation of a typical transmission curve for a common type of glass.

DETAILED DESCRIPTION OF PREFERRED EMBODIMENTS

The plateau region of the transmission curve is formed approximately by the transmittance values which are given at wavelengths greater than $\lambda_3$. According to the invention, laser radiation is used which has a wavelength, depending on the chosen glass, which is shorter than $\lambda_3$, but one at which the transmittance is not negligibly low, which in the FIGURE is the case with the wavelengths greater than $\lambda_0$. A preferred wavelength range, for example, is the range: $\lambda_1 \leqq \lambda \leqq \lambda_2$.

The invention can be practiced as follows, for example:

Ordinary BK 7 glass in the form of a plate with a thickness of 1 mm is irradiated with laser beams of a wavelength of 355 nm, using an Nd-YAG laser. This is performed such that the laser beam is focused by the usual means within the glass plate, with the focal point lying 0.5 mm beneath the surface of the glass plate. The laser is operated with a repetition rate of 5 kHz. The pulse length is 100 nanoseconds, the power density at the focus about 500 $MW/cm^2$.

Marking points are thereby produced which have a diameter of only about 20 $\mu$m. The marking points are lined up at a distance of 5 $\mu$m apart so as to overlap and form a nearly continuous line. The power density used at the focus is decidedly less than the power density required in the known process.

In the above embodiment the repetition rate can also be up to 10 kHz if desired.

For comparison, Suprasil 1 quartz glass was processed under the same external conditions. In contrast to the BK 7 glass, however, the transmittance in this quartz glass for the 355 nm wavelength is in the plateau region. Consequently in the quartz glass the fine structure obtained with the BK 7 glass could not be achieved. Instead, the spread of the marking points in the quartz glass was considerably greater than in the BK7 glass.

The marking produced by the method of the invention can be used, for example, for identification or even decorative purposes.

What is claimed is:

1. A method for producing a mark lying under the surface in a body of glass, wherein said glass exhibits a transmittance curve with a plateau region at wavelengths which are longer than those of x-rays, said method comprising directing a laser beam capable of penetrating the glass body to a predetermined depth at which the mark is to be formed at a surface of the glass body and focusing the laser beam on a location within the glass where the mark is to be formed, said laser beam having a power density such that a mark in the form of a material alteration characterized by a reduced permeability to electromagnetic radiation is produced substantially without occurrence of any perceptible alteration at the surface of the glass body, and wherein the laser beam has a wavelength at which the glass is partially translucent and which is shorter than any wavelength of the plateau region.

2. A method according to claim 1, wherein the laser beam has a wavelength which lies within a wavelength range at which the glass body has a transmittance of 60 to 95% of the plateau region.

3. A method according to claim 1, wherein the laser beam is produced by a neodymium-yttrium aluminum garnet laser.

4. A method according to claim 3, wherein the laser beam wavelength is a third harmonic of the laser.

* * * * *